United States Patent [19]

Small

[11] Patent Number: 5,513,117
[45] Date of Patent: Apr. 30, 1996

[54] APPARATUS AND METHOD FOR ELECTRONICALLY DISPENSING PERSONALIZED GREETING CARDS AND GIFTS

[76] Inventor: Maynard E. Small, 2510 Grand Ave., Kansas City, Mo. 64188

[21] Appl. No.: 507,118

[22] Filed: Jul. 26, 1995

Related U.S. Application Data

[63] Continuation-in-part of Ser. No. 56,706, Apr. 30, 1993, Pat. No. 5,442,567.

[51] Int. Cl.$^6$ ........................................... G06F 17/00
[52] U.S. Cl. .......................... 364/479; 364/468; 235/381
[58] Field of Search ...................... 364/408, 478, 364/479, 468, 410–412; 235/379, 381, 382, 383; 902/18, 30, 21–23, 41; 283/75, 49, 51, 58, 59; 229/71, 68 R, 70; 273/439

[56] References Cited

U.S. PATENT DOCUMENTS

| | | |
|---|---|---|
| 4,414,896 | 11/1983 | Fischer . |
| 4,616,327 | 10/1986 | Rosewarne et al. . |
| 4,625,275 | 11/1986 | Smith . |
| 4,677,565 | 6/1987 | Ogaki et al. . |
| 4,699,532 | 10/1987 | Smith . |
| 4,733,362 | 3/1988 | Haraguchi . |
| 4,789,147 | 12/1988 | Berger et al. . |
| 4,809,837 | 3/1989 | Hayashi ............................... 364/479 |
| 4,817,043 | 3/1989 | Brown . |
| 4,839,829 | 6/1989 | Freedman ........................... 364/519 |
| 4,873,643 | 10/1989 | Powell et al. . |
| 4,896,791 | 1/1990 | Smith . |
| 4,949,257 | 8/1990 | Orbach . |
| 4,970,655 | 11/1990 | Winn . |
| 5,017,953 | 5/1991 | Biondo, Jr. . |
| 5,029,099 | 7/1991 | Goodman . |
| 5,036,293 | 7/1991 | Goodman . |
| 5,036,472 | 7/1991 | Buckley . |
| 5,056,029 | 10/1991 | Cannon . |
| 5,127,104 | 6/1992 | Dennis . |
| 5,132,915 | 7/1992 | Goodman . |
| 5,133,560 | 7/1992 | Small . |
| 5,143,279 | 9/1992 | Gaines . |
| 5,243,174 | 9/1993 | Veeneman et al. ................. 364/479 |
| 5,340,966 | 8/1994 | Morimoto ........................... 235/376 |
| 5,408,417 | 4/1995 | Wilder .................................. 364/479 |
| 5,425,078 | 6/1995 | Stern ..................................... 379/67 |
| 5,426,594 | 6/1995 | Wright et al. .................... 364/514 R |
| 5,442,567 | 8/1995 | Small .................................... 364/479 |

*Primary Examiner*—James P. Trammell
*Attorney, Agent, or Firm*—Litman, McMahon and Brown

[57] ABSTRACT

A vending machine which allows a customer to design and personalize a greeting card also allows the customer to integrate an electronically vendable gift along with or directly onto the card. A stand-alone kiosk includes a credit card verifier, an alphanumeric keyboard, a video screen, a color printer printing on blank or partially printed card stock, and a gift calculator and vender, all controlled by a CPU. In an alternative system and method, a central terminal downloads card and gift selection data to PC's or interactive television via a modem and a user of the PC or interactive television remotely personalizes the card and selects a gift and amount. The card is then printed and physically mailed or sent to the recipient via electronic mail by the central terminal. Examples of gifts available through either system include prepaid long distance telephone calling cards and any other gift accessible via long distance carriers. The gift value and other enabling information such as a predetermined telephone access number and an authorized PIN number can be associated with the personalized card, printed directly onto the personalized card, or printed out at the recipient's terminal.

74 Claims, 8 Drawing Sheets

APPARATUS AND METHOD FOR ELECTRONICALLY DISPENSING PERSONALIZED GREETING CARDS AND GIFTS

CROSS REFERENCE TO RELATED APPLICATIONS

This application is a continuation-in-part of application for U.S. patent Ser. No. 08/056,706 for APPARATUS AND METHOD FOR ELECTRONICALLY DISPENSING PERSONALIZED GREETING CARDS AND GIFTS, filed Apr. 30, 1993, U.S. Pat. No. 5,442,567.

BACKGROUND OF THE INVENTION

I. Field of the Invention

The present invention relates to a greeting card dispensing apparatus and method which gives a customer the capability to simultaneously design a personalized greeting card and include with it an associated gift. The gifts can include such items as a limited amount of toll free calling and/or telephone line access to other items of value, such as congratulatory songs or messages, non-downloadable animated messages, authorization for playing a telephone game contest, or access to downloadable software. For the card recipient to access the telephone lines to receive the prepaid gifts, a toll free 1-800 access number and an identifying PIN number can be printed on the card. A stand alone interactive kiosk is provided for designing, accepting payment for and printing the gift cards. As alternatives, terminals remotely accessible by personal computers with modems and/or interactive television can be provided so that gift cards can be remotely designed, gift types and amounts selected and payment remitted "on line". Such remotely designed and selected greeting cards and gifts can be printed on card stock and mailed or can be electronically created and electronically mailed to a recipient. As a 10 further alternative, an in-store terminal can be provided for use by a customer in designing custom greeting cards and selecting associated gifts, with the cards and gifts remotely printed behind a retail counter for purchase by the customer.

II. Description of the Related Art

The greeting card business in the United States has evolved into a $5+ billion per year industry. Most greeting cards are still produced by manufacturing concerns as generic cards marketed through retail stores. However, a growing number of greeting cards are produced by specialized vending machines or kiosks which permit the customer to, at least partially, personalize the cards. The personalization available at these vending kiosks can run all the way from merely typesetting the names of sender and receiver to writing verses, selecting and/or modifying pictures, colors, sizes, etc. Hallmark Cards, Inc. of Kansas City, Mo., has many of these kiosks in operation under the "Personalize it!" logo, while American Greetings Corp. has a number of operating kiosks under the "CreataCard" logo. The CreataCard kiosks allow great personalizing flexibility since they actually use a plotter pen to write personalized messages and draw any of a number of selected pictures, and Hallmark is test marketing a similar, more versatile kiosk as well. Some industry sources estimate the personalized greeting card business will grow to be a $200+ million dollar industry within five years.

It is no accident that most retail sales outlets for traditional greeting cards are also gift shops as well. It is customary to give a gift on many occasions along with a greeting card, e.g. birthdays, weddings, graduations, etc. Thus, particularly with today's hectic life style, it is more convenient to purchase the gift at the same time and in the same store as the greeting card, or vice versa. By contrast, with the increasing sophistication of the personalized card kiosks, they are now being placed in stand-alone locations in shopping malls, grocery stores, and even airports, etc., where it may not be convenient or even possible to simultaneously purchase a gift as well.

Furthermore, many people, due to work or time constraints, physical disabilities, etc., are unable or unwilling to physically visit retail facilities to access such stand-alone kiosks. For such people, obtaining and sending both greeting cards and gifts is even more problematical.

It would be desirable with such personalized greeting card kiosks for the customer to be able to simultaneously purchase a gift along with the personalized card. Such gifts must be capable of being electronically vended by the same kiosk, including, preferably the same card printer. Furthermore, it would be desirable if the gifts themselves, or a receipt evidencing the gifts, could be printed on the personalized card itself. For persons without the ability to physically visit such retail kiosks, on-line computer or interactive television access to such a custom greeting card and gift dispensary would be desirable.

SUMMARY OF THE INVENTION

The present invention is an automated vending apparatus for simultaneously dispensing personalized greeting cards and electronically vendable gifts. A stand-alone kiosk housing incorporates a video monitor, an input alphanumeric keyboard, a credit card reader, and/or cash receiving equipment. A CPU within the housing controls each of these devices, along with a blank card stock feeder, a color printer, a credit verification modem, and a gift table memory and encoder. The gift table memory and encoder can be programmed to encode gifts such as, for example, toll free calling time on a major long distance carrier to permit the recipient to call the sender or a third person and/or telephone line access to other items of value, such as congratulatory songs or messages, non-downloadable animated messages and/or songs, pre-paid authorization for playing a telephone game contest, or access to downloadable software. A toll free number and PIN number can be printed directly on the card with instructions on accessing the particular telephone gift. Such telephone numbers, PIN numbers and instructions can be printed on a portion of the card with a printed or perforated billfold-size outline permitting easy removal and storage thereof. Other gift possibilities include wagers on the recipient's favorite sports team (such as in Nevada where sports wagering is legal), gift certificates to department stores, etc., or even money in the form of money orders. Virtually any gift which can be evidenced by an electronically generated personalized printout can be generated and combined with, or printed directly on, a personalized card from the kiosk.

As an alternative to a stand-alone kiosk, a remote terminal with the same functions and capabilities can be accessed via personal computers equipped with modems and/or interactive television with the computer monitor or television screen used for display, selection, personalizing and sending the card and gift. Interactive data input at the personal computer or interactive television can be via a conventional keyboard and/or a speech recognition module. As a further alternative, an in-store terminal can be provided for use by customers in creating custom designed greeting cards and associated gifts within a retail establishment. With such a retail operation, the terminal can be placed in a customer accessible location, with a printer controlled by the terminal located behind the retail counter. A retail clerk can then print a customized greeting card and associate with the card a gift including a prepaid telephone authorization, and collect payment from the customer prior to dispensing the card and gift.

OBJECTS AND ADVANTAGES OF THE INVENTION

The principle objects and advantages of the invention include: to provide an improved electronically controlled apparatus for generating personalized greeting cards and gifts; to provide such an apparatus in which the greeting cards can be created from a number of selected pictures and text, with additional text added by the customer; to provide such an apparatus in which an electronically generated gift can be purchased with the personalized card; to provide such an apparatus in which a CPU is connected to an alphanumeric keyboard and video display which permits the customer to view a representation of the personalized card prior to final printing; to provide such an apparatus in which a gift table memory and encoder is also connected to the CPU and the printer; to provide such an apparatus in which purchases can be made by cash, debit, smart card or credit card; to provide such a method in which a personalized greeting card can be combined with an electronically generated gift in a single operation; to provide such a method and apparatus in which a central terminal is accessible on-line via personal computer or interactive television so that greeting cards and associated telephone line accessible gifts can be displayed, selected, personalized, paid for and mailed from a remote location; to provide such an apparatus and method in which cards and associated gifts can be designed on an in-store terminal and printed out by a sales clerk; to provide such an in-store system in which the combined card and gift has a UPC price code printed thereon for automated pricing; to provide such an apparatus and method in which other gift categories can include telephone line access to other items of value, such as congratulatory songs or messages, non-downloadable computer accessible animated messages and/or songs, authorization for playing a telephone game contest, toll free access to a recorded audio message and/or music subscriptions to On-Line computer services, gift certificates with verification via a toll free telephone number and PIN number or access to downloadable software; and to provide such an apparatus and method which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figures 1, 2, 3:
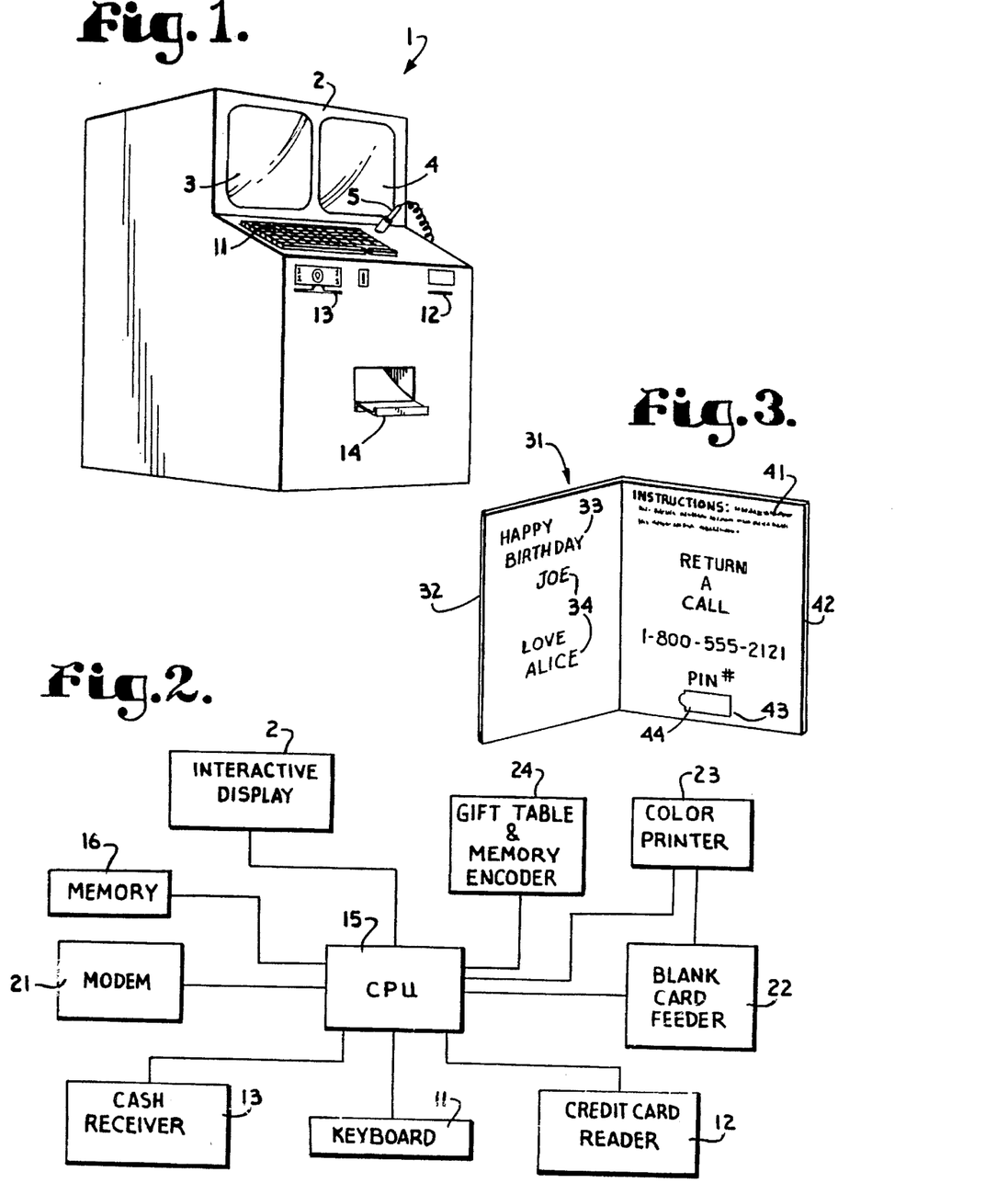
FIG. 1 is a perspective view of an electronic apparatus for dispensing personalized greeting cards and gifts, in accordance with the present invention.
FIG. 2 is a schematic block diagram of the electronic apparatus.
FIG. 3 is a perspective view of a combination personalized greeting card and gift generated by the apparatus of FIG. 1.

Referring to FIG. 1, the numeral 1 generally refers to an apparatus for dispensing personalized greeting cards and gifts. A video display section 2 may include a pair of displays 3 and 4, with the display 3 including a transparent interactive overlay which permits a customer to directly select displayed items with a stylus 5 or by means of a touch screen. A fixed alphanumeric keyboard 11 is used for customer input of alphanumeric and other information. A credit card or debit card reader module 12 and a cash receiver 13 provide alternate modes for customer payment. Finished cards and gifts are delivered via a dispensing tray 14.

Referring to FIG. 2, a block schematic diagram of the apparatus 1 is illustrated. A programmable integrated CPU 15, including ROM and RAM memory 16, is connected to the keyboard 11, the cash receiver and totalizer 13, and the credit card reader 12. The CPU 15 is also connected to the interactive display panel 2 and to a modem 21. The modem 21 is used to dial a preprogrammed credit card verification facility to confirm credit availability for a customer who inserts a credit card in the reader 12 and inputs an associated personal identification number or PIN via the keyboard 11.

A blank card feeder 22 is also connected to the CPU 15, and the feeder 22 stores and feeds card blanks to a color printer 23. A gift table memory and encoder 24 is connected to the CPU 15 as well.

FIG. 3 illustrates a combination greeting card/gift article 31 vended from the apparatus 1. The card 31 includes a typical front cover 32, which can be personalized with a variety of verses and other text 33 accessed via the interactive display 3 via the CPU 15 and the memory 16. The preprogrammed text can be interspersed with personal data input from the keyboard 11, such as, for example, the sender's and receiver's names 34, birth dates, hair color, etc. In a similar manner, images can be selected from a variety of stored digitized images, which can be categorized in a menu driven system displayed on the displays 3 and 4. The entire selection and personalization of cards 31 can be accomplished as taught, for example, in U.S. Pat. No. 5,036,472 to Buckley et al., which is hereby incorporated herein by reference.

Once the card 31 has been selected and personalized, a gift menu can be called up on the displays 3 and 4. The gift menu can read as follows:

SELECT A GIFT

PLEASE SELECT ONE OF THE FOLLOWING:

1. SPELLIT GAME PLAY
2. ADDITUP GAME PLAY
3. STORE GIFT CERTIFICATE
4. TOLL FREE CALLING CARD
5. LOTTERY TICKET

Once a particular one of the gift possibilities has been selected via the keyboard 11 or the interactive display 3, a submenu will appear giving additional directions to the customer. For example, should the customer select Category 4 for a toll free calling card, the next screen can read as follows:

| TOLL FREE CALLING CARD INPUT DOLLAR AMOUNT OF CALLING CREDIT | | | |
| --- | --- | --- | --- |
| $5.00 - 10 min. | $10.00 - 20 min. | $20.00 - 40 min. | OTHER |

The kiosk operator preferably has an arrangement with a long distance telephone carrier for prepaid calling credit. The customer would then be given an opportunity to confirm the transaction, as follows:
THE PRICE FOR THIS CALLING CARD IS $10.00. PLEASE CONFIRM THAT THIS AMOUNT IS TO BE CHARGED TO YOUR CREDIT CARD # _ _ _ BY PRESSING THE ENTER KEY.

Once the customer has confirmed the transaction, the personalized card 31 is printed with an instruction message 41 directing the recipient to call a toll free number on the page 42 of the card 31, along with a PIN access number at 43. The PIN number 43 may be covered by an opaque, peelable gum substance 44 or scratch off substance so that the sender or recipient will know if the card 31 has been tampered with.

A similar procedure along with similar dedicated menu prompts will be provided to a customer selecting any of the other gift categories. For example, for the store gift certificate, a number of participating national merchants can be listed, with the customer selecting a particular store and then selecting a certificate dollar amount from a number of preprogrammed dollar amounts. A store logo and certificate information can then be printed on the page 42 of the card 31, as well as a UPC code or other identifying data (not shown) related to the price to be paid for the card and gift, inventory control, etc., particularly in the event a store clerk is to be involved. Similar menu and customer selection procedures are used for the telephone skill game chances such as SPELLIT and ADDITUP.

The gift calculator and encoder 24 can be comprised of a stand-alone microprocessor and memory which is compatible with the CPU 15. Alternatively, the gift table memory and encoding functions can be programmed into the CPU 15 and associated memory 16.

Figure 4:
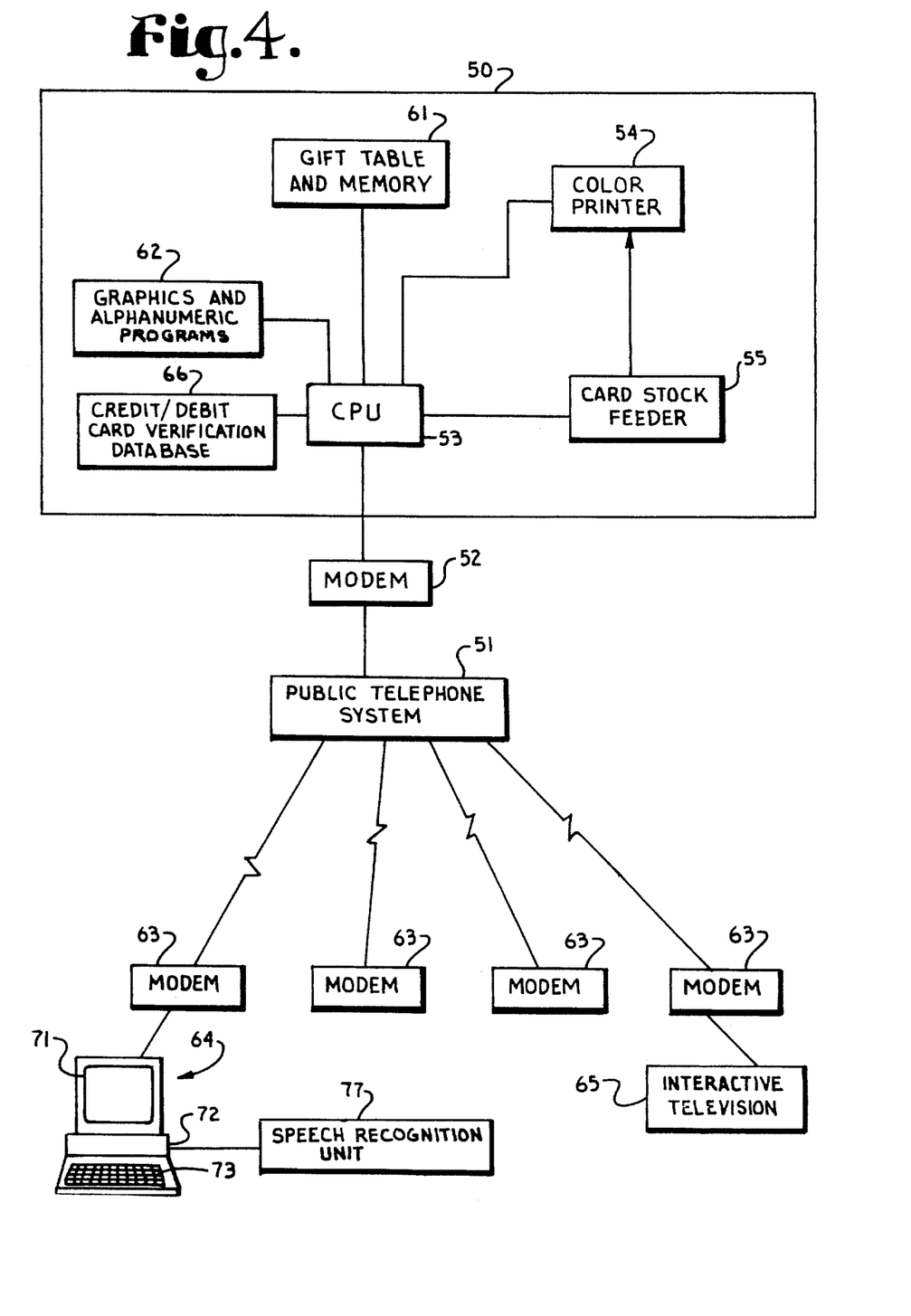
FIG. 4 is a schematic block diagram of a first alternative system for designing, accessing, dispensing and mailing greeting cards and gifts.

FIG. 4 illustrates a first alternative system and method for designing personalized greeting cards, selecting gifts and gift amounts from a menu and printing and mailing the personalized greeting card and gift. A greeting card and gift terminal 50 is connected to the public telephone system 51 via a modem 52. The terminal 50 is similar to the self contained system included in the kiosk 1 and includes a CPU 53 connected to a color printer 54 and a blank card stock feeder 55. The CPU 53 is also connected to a gift table and memory 61, and memory 62 including a graphics program capable of supporting a wide variety of personalized greeting card graphics and alphanumerics. The memory 62 can contain, for example, a variety of sample cards with predesigned graphics and messages in a variety of categories, such as birthday greeting, anniversary cards, wedding cards, and a variety of holiday cards. Cards from any of these categories can be called up onto a monitoring screen and personalized by the customer. Personalizing can include merely printing the name and address of the recipient and/or the sender on the card or it can include the addition of custom graphics or personalized messages to alter or add to the predesigned graphics and messages on the selected card. The CPU 53 is also connected to a credit/data card verification database 66 so that customer credit cards can be verified prior to creating and forwarding greeting cards and gifts. The database 66 can be a remotely located credit verification service, as is well known in the art.

Remote access to the terminal 50 is provided over the public telephone system 51 via corresponding modems 63 connecting any number of personal computing terminals 64 as well as interactive televisions 65. Each PC 64 is preferably equipped with a standard color monitor 71 driven by a CPU 72 and connected to an interactive keyboard 73 which can interface with the remote terminal 50. An optional speech recognition unit 77 is provided for spoken data entry. Of course, other known data entry devices can be used, such as an electronic mouse, trackball, joystick, etc. While the speech recognition unit 77 has been illustrated as being located at the PC 64, another option would be to provide a centralized speech recognition unit at the central terminal 50 which the customer can access via a telephone link.

Figure 5:
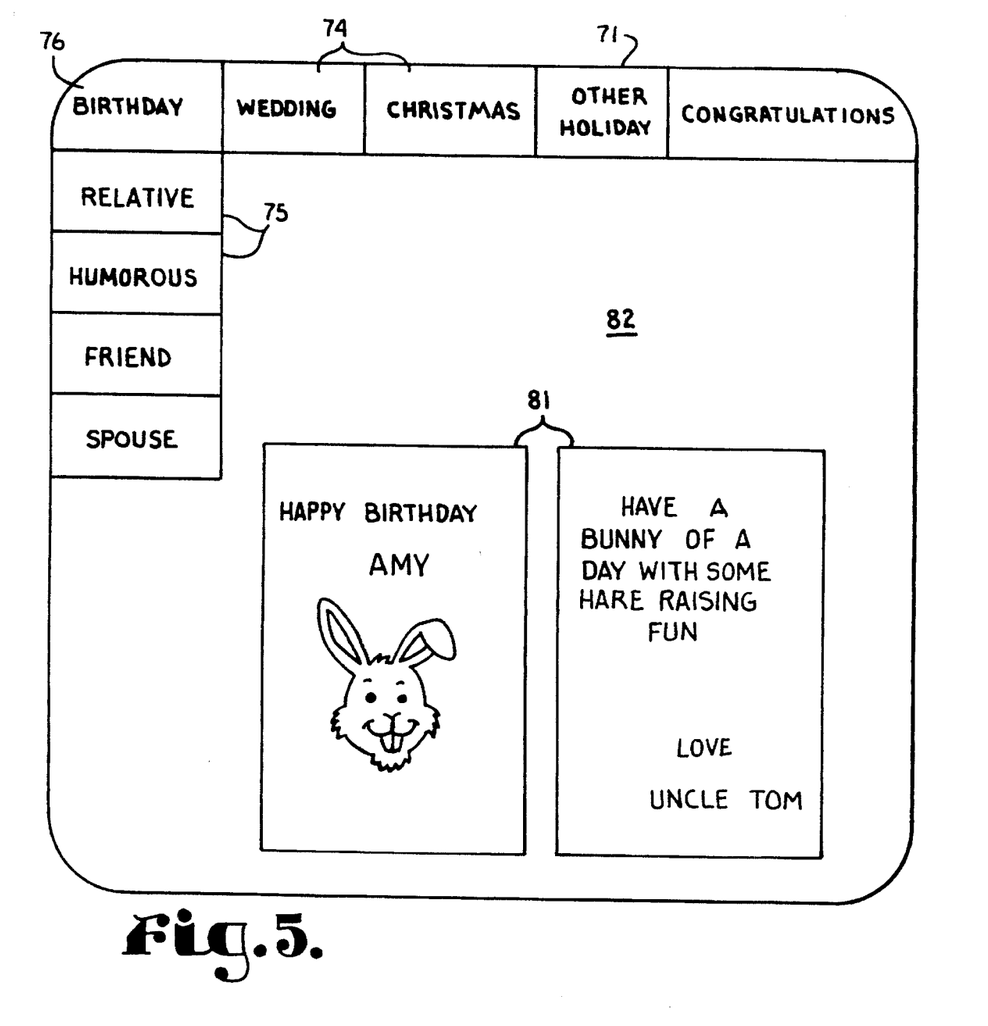
FIG. 5 is an illustration of a representative menu for a personal computer or interactive television for designing personalized greeting cards.

Referring to FIG. 5, a PC monitor 71 or interactive television screen 65 is shown displaying a representative menu for selecting a greeting card category and customizing a selected greeting card. A variety of pull down menus 74 with different greeting card categories are displayed along the top of the monitor 71 or screen 65. Once a greeting card category is selected, a variety of predesigned greeting card subcategories 75 can be selected, as shown with the birthday category 76, for example. Although not illustrated, other layers of subcategories can be included under the subcategories 75, such as humorous, poetry, belated wishes, etc. Once a card, such as the card 81, is selected, it is displayed on the monitor in card display area 82 where it can be personalized with text or custom graphics in a known manner.

Figure 6:
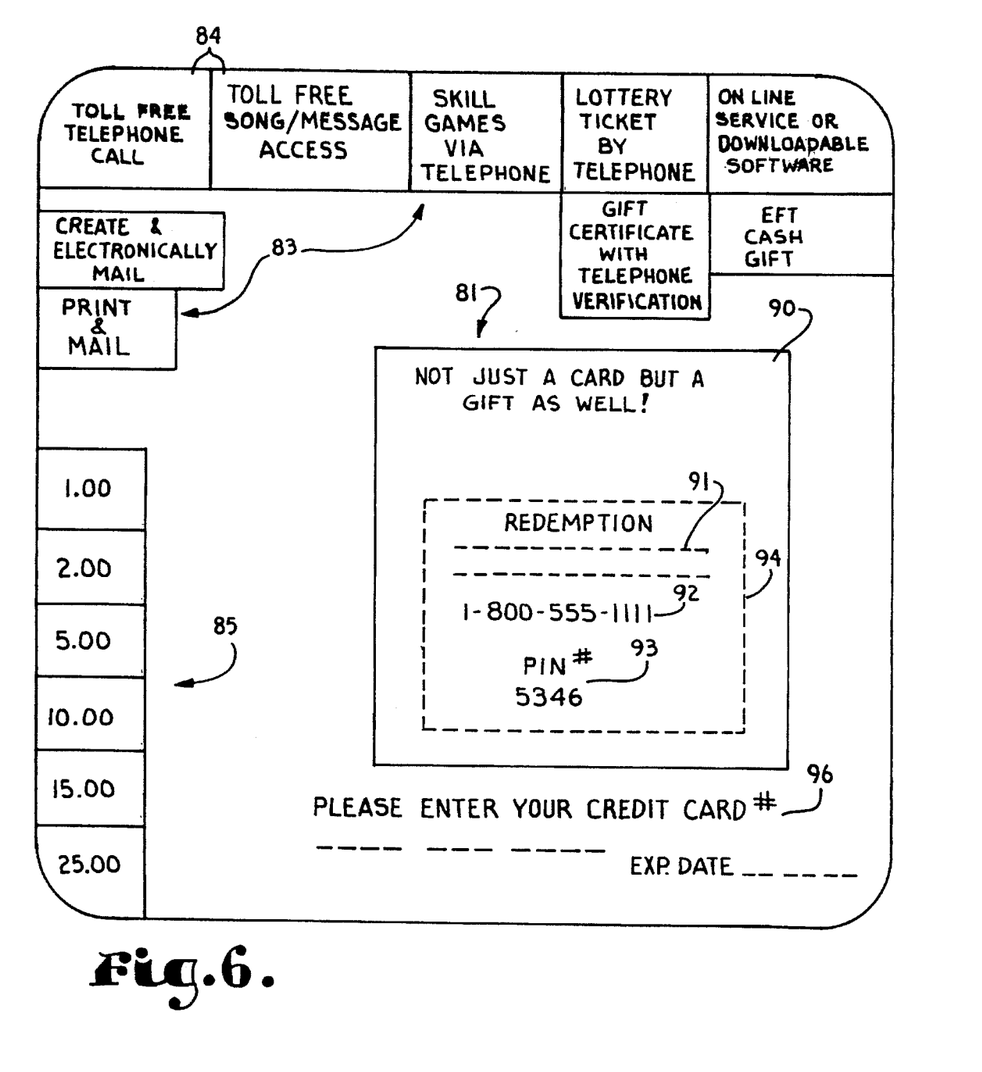
FIG. 6 is an illustration of a representative menu for a personal computer or interactive television for selecting gifts, gift amounts, and remitting payment for gifts and cards.

As shown in FIG. 6, once the card 81 is personalized to the satisfaction of a customer, a select gift menu 83 is displayed with a variety of gift categories in pull down menus 84. The gift categories can include, without limitation, toll free calling over a long distance carrier; toll free telephone access to recorded, customized congratulatory songs or messages and/or computer accessible animated greetings; telephone access to games of skill or chance, such as SPELLIT; prepaid lottery tickets which the recipient can select numbers via telephone; or prepaid subscriptions to an On-Line service such as "America On Line" or "Compuserve", for example, or to downloadable software accessible by computer. Other possible gift categories (not shown) include gift certificates to major retail outlets, prepaid movie or entertainment tickets, prepaid meals, or any other gift which can be evidenced by a printed card. In any of these categories, various gift amounts can be selected and the customer will be prompted interactively to enter a credit card number to pay for the greeting card 81, the gift and any postage for mailing the card 81. Alternatively, credit card verification can be accomplished immediately after log-on by the customer.

Referring again to FIG. 6, as the particular gift and amount is selected, it is displayed on a gift portion 90 of the greeting card 81 along with instructions 91 for redeeming the gift, a toll free number 92 for accessing the gift, where appropriate, and a PIN number 93 for uniquely identifying the recipient in redeeming the gift. The gift information, including instructions 91, toll free number 92 and PIN number 93 can be printed in an outlined wallet sized window area 94 which, when printed, can be peripherally perforated with perforation lines 95 for easy separation from the card 81. It should be noted that, although both the toll free number 92 and a PIN number 93 have been illustrated as displayed on the customer's computer monitor 71, such numbers would not actually be displayed until payment was verified and accepted. Once the greeting card 81 and the gift and amount are displayed to the satisfaction of the customer, he is prompted to enter a credit card number, as indicated at instruction 96, which is validated by the remote terminal 50. Once validated, the customer selects "Print and Mail" from the menu 83 and the central terminal 50 prints the personalized card 81 as it was finally displayed on the monitor 71 and it is placed in the mail to the ultimate recipient, postage prepaid. Alternatively, the customer can select "Create and Electronically Mail" from the menu 83 and the greeting card 81 and associated gift information 90 is created and electronically mailed to a recipient's computer by the central terminal 50.

Figure 7:
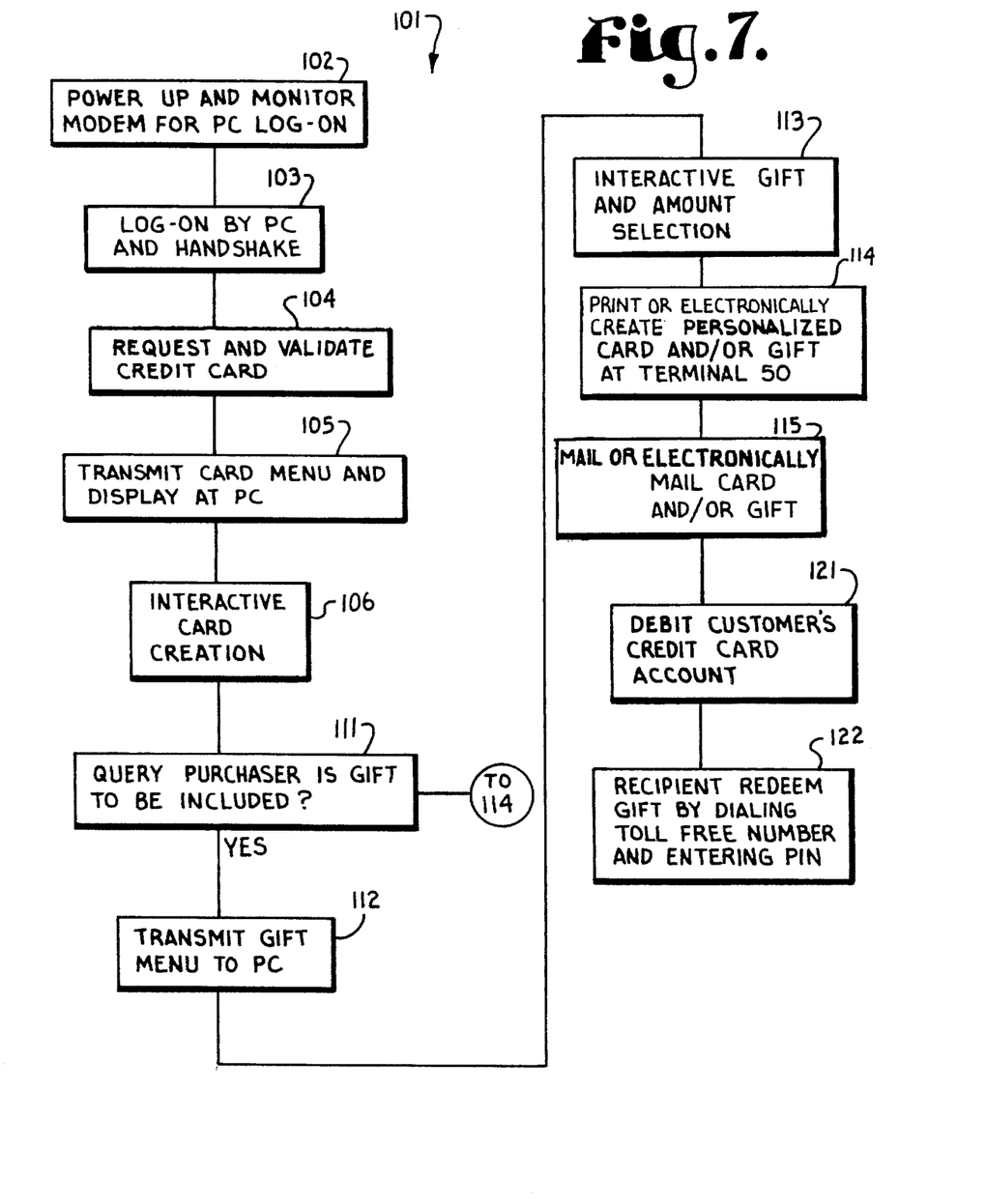
FIG. 7 is a logical block diagram of a representative algorithm used to access a greeting card database, personalize a greeting card, select a gift and a gift amount, and print and mail a personalized greeting card and gift all from a remote location.

Referring to FIG. 7, a logical block diagram 101 illustrates the algorithm performed by the central terminal 50 and a connected PC 63. At block 102, the system is powered up and monitored for a PC log-on or a log-on from an interactive television 65. At block 103, a PC 63 or television 65 logs onto the central terminal 50 and a handshake is completed. At block 104, the central terminal 50 queries the customer for a credit card number, which is verified before further proceedings. At block 105, the card menu 74 is transmitted to the PC 63 or television 65 where it is displayed. At block 106, the customer interactively personalizes the greeting card 81. At block 111, the customer is queried as to whether a gift will be included with the card. If the answer is NO, at blocks 114 and 115, the personalized card is printed and mailed. If a gift is to be included, at block 112, the gift menu 83 is transmitted to the PC 63 or television 65 and displayed thereon. At block 113, the gift category and amount is interactively selected by the customer and then, again, at blocks 114 and 115, the card and gift are either printed and mailed or created and electronically mailed by the central terminal 50 to a designated recipient. In either instance, a prompt (not shown) would be displayed for the customer to enter pertinent address information. At block 121, the customer's credit card account is debited. At block 122, the recipient of the card and gift redeems the gift by dialling the toll free number 92 and entering the PIN number 93, both as printed on the card 81, or as separately forwarded.

Figure 12:
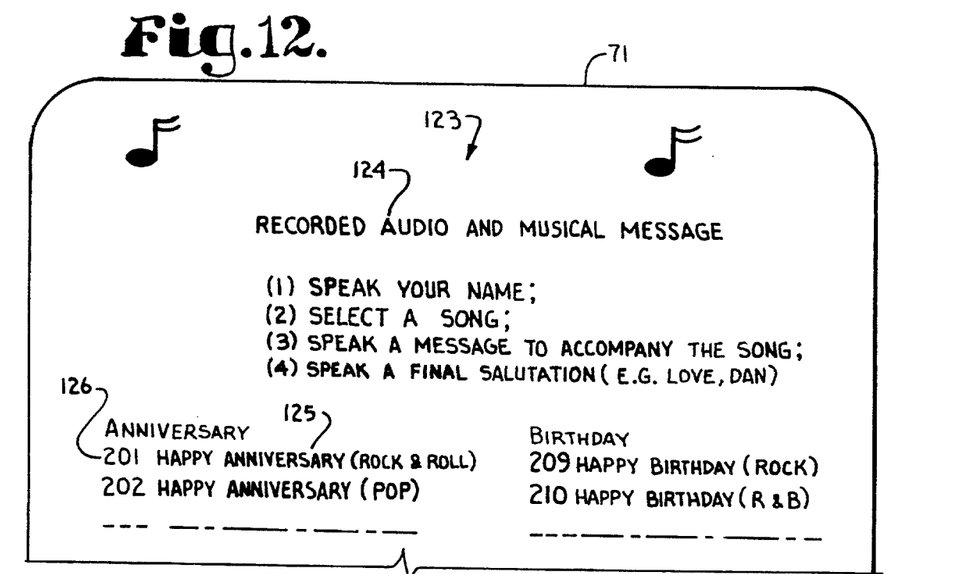
FIG. 12 is an illustration of a representative menu for a personal computer or interactive television for selecting and customizing a recorded audio message gift accessible via a toll free telephone number.

FIG. 12 illustrates a representative menu 123 for display on the personal computer 64 or interactive television 65 for customizing a gift of toll free telephone access to recorded congratulatory songs and/or messages. On the screen 71, an instruction set 124 instructs a customer to, in sequence:

RECORDED AUDIO AND MUSICAL MESSAGE (1) SPEAK YOUR NAME;
(2) SELECT A SONG;
(3) SPEAK A MESSAGE TO ACCOMPANY THE SONG;
(4) SPEAK A FINAL SALUTATION (e.g. Love, Dan)

A listing of available songs 125 is displayed along with numerical identifiers 126 for ease in selection. Each message in the instruction set will be highlighted in turn as a customer answers the previous query. Recording can be accomplished by the customer via a toll free telephone hook-up and PIN number or the like or a microphone associated with a personal computer modem 63, for example.

In order to redeem the recorded gift message, a recipient is given instructions to dial a toll free number and then to enter an identifying PIN number, such as the numbers 43 on the card 31. Once the proper PIN number is entered, the recorded message and selected song, including the customized voice overlays spoken by the sender, will be played to the recipient.

Figure 13:
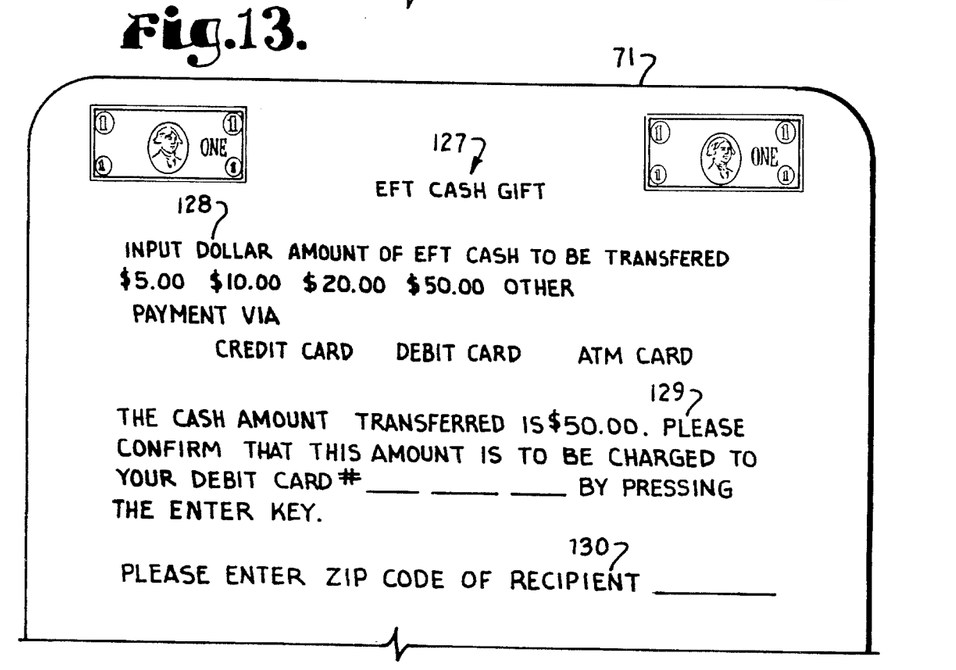
FIG. 13 is an illustration of a representative menu for a personal computer or interactive television for selecting and customizing an Electronic Funds Transfer (EFT) cash gift.

FIG. 13 illustrates a representative menu 127 for display on the personal computer 64 or interactive television 65 for ordering a gift of Electronic Funds Transfer (EFT) cash. On the screen 71, an instruction set 128 instructs a customer to, in sequence:

| EFT CASH GIFT |
|---|
| INPUT DOLLAR AMOUNT OF EFT CASH TO BE TRANSFERRED |
| $5.00  $10.00  $20.00  $50.00  OTHER |
| PAYMENT VIA |
| CREDIT CARD  DEBIT CARD  ATM CARD |

Once a cash amount is selected and a payment method is indicated, the next message 129 is displayed, i.e.:
THE CASH AMOUNT TRANSFERRED IS $50.00. PLEASE CONFIRM THAT THIS AMOUNT IS TO BE CHARGED TO YOUR DEBIT CARD # _ _ _ BY

PRESSING THE ENTER KEY.

Finally, when the payment is debited from the customer's account, the next message 130 is displayed:
PLEASE ENTER ZIP CODE OF RECIPIENT __

Once the customer has confirmed the transaction and entered the requested zip code or other identifying data, a personalized card similar to the card 31 (or an electronic file is created) with an instruction message directing the recipient to call a toll free number. Once the number is accessed, a voice message will instruct the user to enter the PIN number. Additional security can be added by requiring the recipient to enter a zip code, area code, street address, etc. in addition to the PIN number, or the PIN number can be sent by separate letter. When all of the entered information checks out as authentic, the recipient is audibly given a security code which is usable at selected ATM or cash dispensing machines to redeem the EFT cash gift, either with or without an ATM card. If the recipient has a credit card or bank account the EFT cash gift could be transferred by the recipient and credited to their financial account using the same information required to obtain the funds at the ATM or cash dispensing machines. The recipient would then use the normal method of accessing their financial account, i.e. by check or draft or by phone or computer links, as is well known in bank at home systems. Of course, any banking fees or wire fees, etc. for the transaction would be debited from the customer's account as well.

Figure 8:
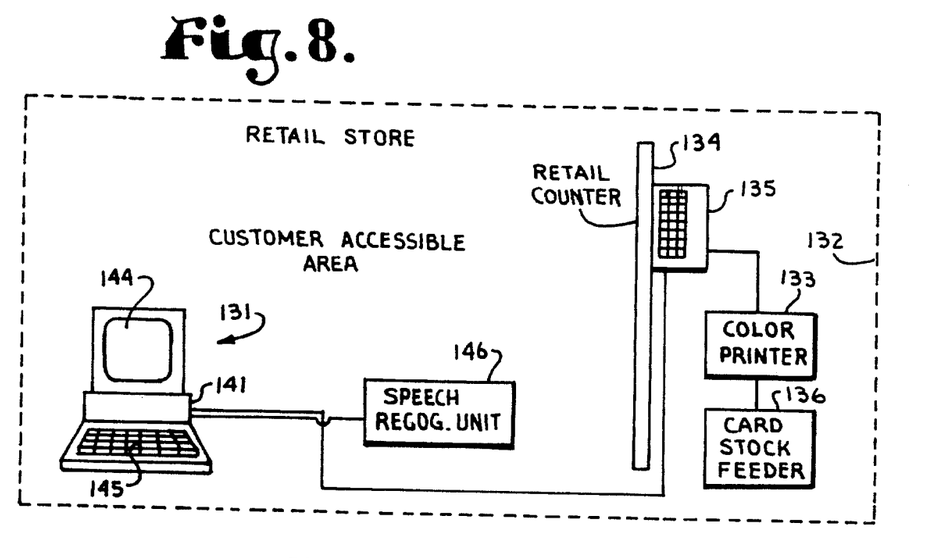
FIG. 8 is a schematic block diagram of a second alternative system for designing, accessing, dispensing and mailing greeting cards and gifts.

FIG. 8 illustrates a second alternative system and method for designing personalized greeting cards, selecting gifts and gift amounts from a menu and printing and dispensing the personalized greeting card and gift. A greeting card and gift terminal 131 is positioned in a customer accessible area of a retail store 132, with a color printer 133 located behind a retail counter 134. The printer 133 is connected to and controlled by the terminal 131, except that any cards and/or gifts to be printed on the printer 133 must be authorized by a retail clerk via a keypad 135, with card stock loaded from a card stock feeder 136, also located behind the counter 134. The terminal 131 is similar to the self contained system included in the kiosk 1 and includes a CPU 141 connected to the color printer 133 and the blank card stock feeder 136. The CPU 141 is also connected to a gift table and memory similar to the memory 61 in FIG. 4, and a memory including a graphics program capable of supporting a wide variety of personalized greeting card graphics and alphanumerics, such as the memory 62 in FIG. 4, for display on a monitor 144. Card and gift selection and personalization proceed with the terminal 131 in a manner similar to that described above for the kiosk 1 and the remote PC terminals 64 and is accomplished via a keypad 145, a speech recognition unit 146, or other data input devices. Selection menus on the terminal 131 can be similar to those illustrated in FIGS. 5 and 6.

Figure 9:
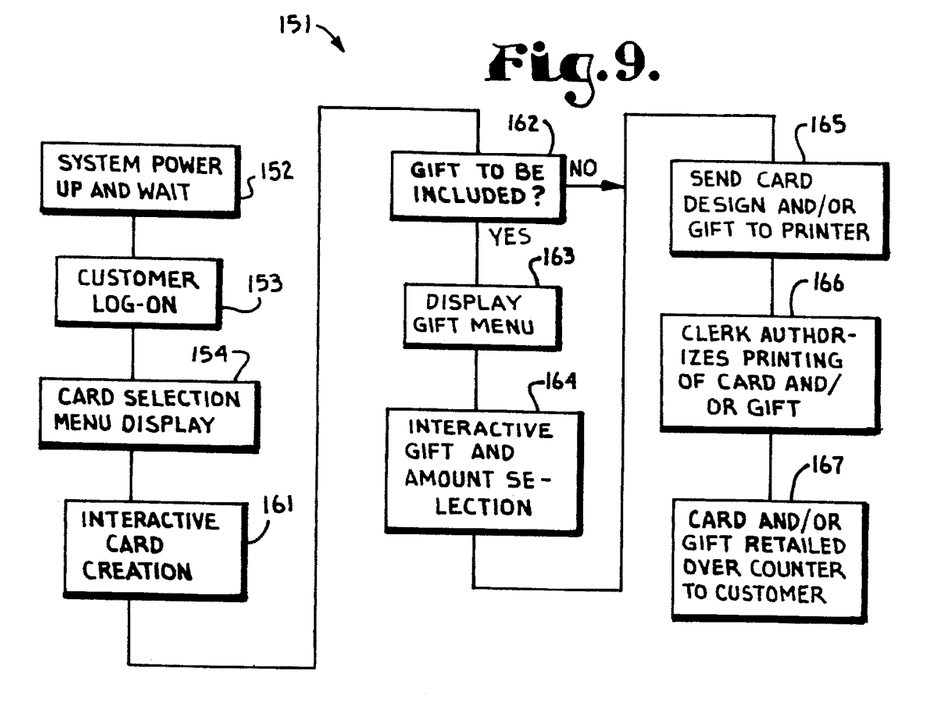
FIG. 9 is a logical block diagram of a representative algorithm used to access a greeting card database, personalize a greeting card, select a gift and a gift amount from an in-store terminal, with the card and gift being printed by a printer located behind a retail counter with the resultant card and gift being purchased in a normal retail transaction.

Referring to FIG. 9, a logical block diagram 151 illustrates the algorithm performed by the retail terminal 131. At block 152, the system is powered up and monitored for a customer log-on. At block 153, a customer logs onto the system and, at block 154, a card selection menu, such as the card menu 74 shown in FIG. 5, is displayed on the terminal monitor 144. At block 162, the customer is queried as to whether a gift will be included with the card. If the answer is NO, the personalized card is sent to the printer at block 165 and, at block 166, a retail clerk authorizes printing of the card, which is sold to the customer over the counter, at block 167. If a gift is to be included, at block 163, a gift menu, such as the menu 83 in FIG. 6, is displayed on the terminal monitor 144. At block 164, the gift category and amount is interactively selected by the customer and then, at blocks 165 and 166, the card is authorized to be printed by the retail clerk and it and the selected gift, which can be printed directly on the card, or simply associated with the card, are sold to the customer over the retail counter, at block 167.

In the event that a gift of EFT cash is selected via the terminal 131, a customer would enter an authorization to debit the customer's electronic funds account, such as a credit card, debit card, or ATM card, as illustrated in FIG. 13. Payment to a retail clerk would then be only for the amount of the personalized card and any store fees associated with the use of the terminal 131 for gift selection.

Figure 10:
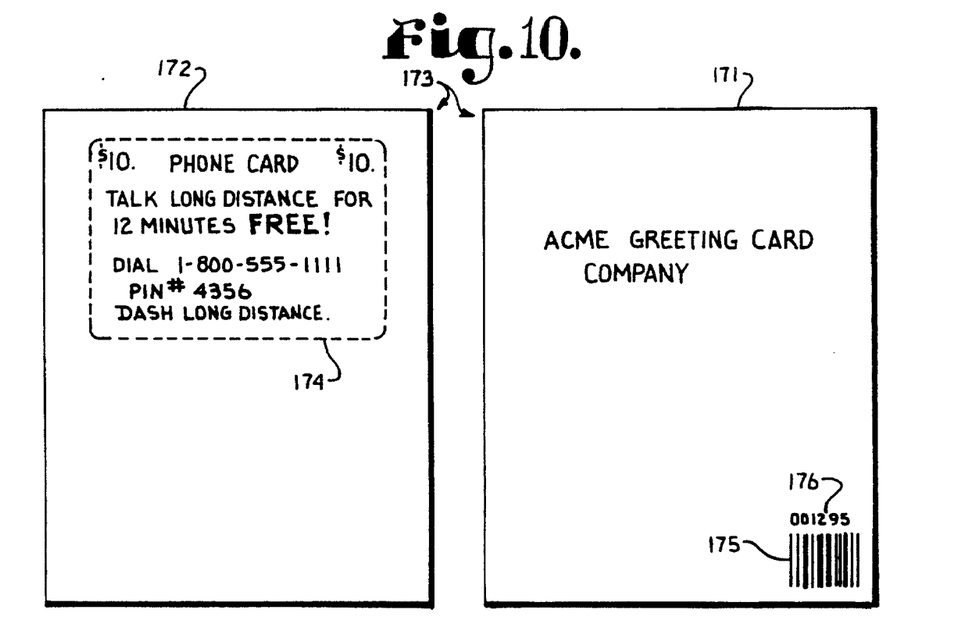
FIG. 10 is an illustration of a representative page from a greeting card and gift with the gift being a prepaid telephone calling card on one side, and, on the reverse side, a printed numerical price code and price bar code.

Referring to FIG. 10, a back cover 171 and the inside of the back cover 172 of a representative card 173 is illustrated for sale over the counter as shown in FIGS. 8 and 9. Once the card 173 is customized by the customer and a gift type and amount is selected, such as the $10 calling card 174, the terminal 131 calculates a final price for the combined card and gift and directs the printer 133 to print a UPC code 175, as well as optional pricing information 176 on the back cover 171 of the card 173.

Figure 11:
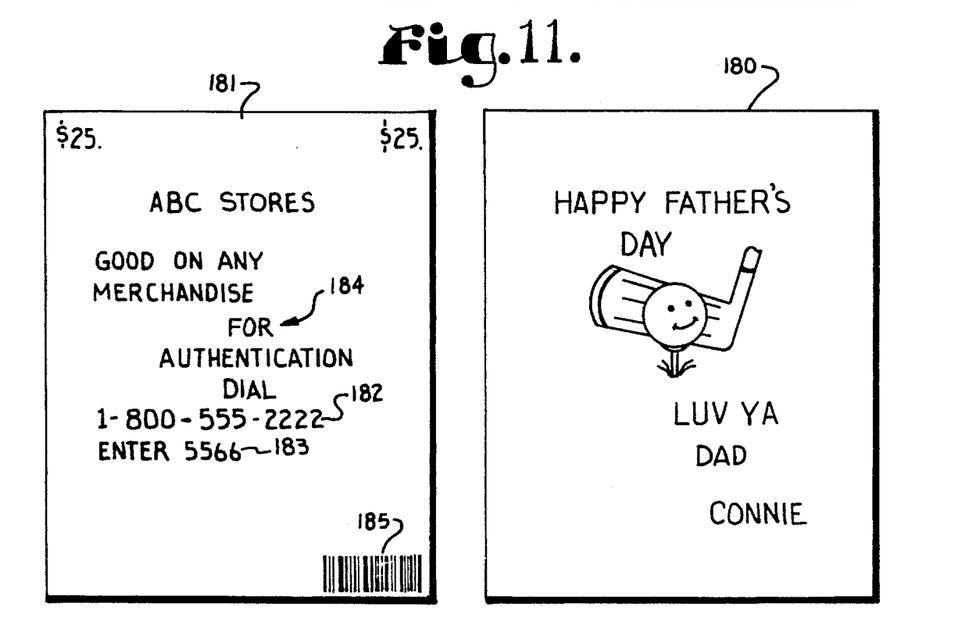
FIG. 11 is an illustration of representative inside facing pages from a greeting card and gift with the gift being a prepaid retail gift certificate with a toll free telephone verification number.

FIG. 11 illustrates an alternative combined card 180 and gift certificate 181 including a toll free telephone number 182 and a PIN number 183 for authenticating the gift certificate 181. The gift certificate, for "ABC Stores", includes instructions 184 for a retail clerk accepting such a gift certificate to dial the toll free number and enter the PIN number. In response, a database at the dialled extension indicates to the clerk that the card is valid for the purchase amount indicated. A bar code 185 is printed on the gift certificate 181 for authentication and pricing information.

As previously mentioned, although PIN numbers and other authorizing data can be printed directly on the greeting card, for added security, the PIN numbers can be forwarded by separate mailing, or, in the case of an electronic mail transfer, by separate transmission.

It is to be understood that while certain forms of the present invention have been illustrated and described herein, it is not to be limited to the specific forms or arrangement of parts described and shown.

What is claimed and desired to be secured by Letters Patent is as follows:

1. A method of creating and forwarding a combination personalized greeting card and electronically generated gift comprising the steps of:

(a) remotely interconnecting a central terminal and a remotely located interactive terminal;

(b) displaying a menu of alphanumeric and/or graphic information on a monitor at the interactive terminal from which a customer at the interactive terminal can select data to be used to personalize said card;

(c) prompting the customer to select said card data and/or add personal information via a data input means at the interactive terminal to create personalized greeting card data for said card;

(d) displaying on said interactive terminal monitor a menu of gift categories accessible via prepaid long distance telephone access accounts and a plurality of gift values from which a customer can select a particular gift category at a selected value via said data input means;

(e) prompting the customer to select said gift category and said value via said data input means;

(f) creating, at said central terminal, a greeting card with said personalized greeting card data;

(g) associating with said greeting card information concerning said selected telephone access account including a predetermined telephone number for accessing said prepaid long distance account and account authorizing data; and (h) forwarding the card and the associated gift information to the customer or a recipient.

2. A method as in claim 1, and further including the step of prompting the customer to select between the alternatives of printing and mailing the card and associated gift or electronically creating and electronically forwarding said personalized card and associated gift to a recipient.

3. A method as in claim 1, and further including the step of prompting the customer to enter a credit card or debit card number as payment for said card and associated gift.

4. A method as in claim 1, wherein said creating and associating steps include printing said personalized greeting data on said greeting card and associating printed gift information concerning said selected telephone access account along with said greeting card.

5. A method as set forth in claim 4 wherein said associating step includes printing said gift information including said predetermined telephone number for accessing said prepaid long distance account directly on said card.

6. A method as set forth in claim 5 wherein said gift information printing step includes printing said gift information in a billfold sized window of said card.

7. A method as set forth in claim 6 wherein said billfold sized window includes a margin formed by perforating said card such that said window is easily removable from said card.

8. A method as in claim 4, wherein said forwarding step includes mailing said greeting card and said associated gift information to said recipient.

9. A method as in claim 1, wherein said creating and associating steps include creating an electronic file including said greeting card with said personalized data and gift information concerning said selected telephone access account.

10. A method as in claim 9, wherein said forwarding step includes electronically mailing said electronic file to said recipient for display and/or printing by the recipient.

11. A method as in claim 1, wherein said gift category displaying step includes displaying the following gift category: a prepaid telephone calling card via said prepaid telephone account.

12. A method as in claim 1, wherein said gift category displaying step includes displaying the following gift category: a prepaid chance at a skill game accessible via said prepaid telephone account.

13. A method as in claim 1, wherein said gift category displaying step includes displaying the following gift category: toll free remote computer access to prerecorded animation and/or audio or musical messages via said prepaid telephone account.

14. A method as in claim 1, wherein said gift category displaying step includes displaying the following gift category: toll free telephone access to prepaid downloadable software via said prepaid telephone account.

15. A method as in claim 1, wherein said gift category displaying step includes displaying the following gift category prepaid account on an On-Line computer database accessible via said telephone account.

16. A method as in claim 1, wherein said gift category displaying step includes displaying the following gift category toll free remote access to prerecorded audio or musical messages via said prepaid telephone account.

17. A method as in claim 16, and further comprising the step of selecting said toll free access to prerecorded audio or musical messages via said prepaid telephone account and customizing said prerecorded audio or musical messages.

18. A method as in claim 17, wherein said customizing step includes:

(a) selecting a prerecorded musical message; and (b) recording, in the customer's own voice, a custom audio message to accompany the prerecorded musical message.

19. A method as in claim 1, wherein said gift category displaying step includes displaying the following gift category: prepaid EFT cash gift payable at a selected ATM or cash dispensing machine, with a security code accessible via said telephone account.

20. A method as in claim 1, wherein said gift category displaying step includes displaying the following gift category: prepaid gift certificate with a security password accessible via said telephone account.

21. A method as in claim 1, and further comprising the steps of:

(a) redeeming said gift by dialling said predetermined telephone number to access said prepaid telephone account; and (b) entering said authorizing data to validate said recipient as entitled to use said prepaid telephone account.

22. A method as set forth in claim 1 wherein said authorizing data includes a PIN number.

23. A method as set forth in claim 1 wherein said printing step includes printing said gift information including said predetermined telephone number for accessing said prepaid long distance account and said account authorizing data in a billfold sized window of said card.

24. A method as set forth in claim 23 wherein said billfold sized window includes a margin formed by perforating said card such that said window is easily removable from said card.

25. A method as set forth in claim 1 wherein said prompted customer selections are entered by voice via a speech recognition unit.

26. A method of creating and forwarding a combination personalized greeting card and electronically generated gift comprising the steps of:

(a) remotely interconnecting a central terminal and a remotely located interactive terminal over a telephone line;

(b) displaying a menu of alphanumeric and/or graphic information on a monitor at the interactive terminal from which a customer at the interactive terminal can select data to be printed to personalize said card;

(c) prompting the customer to select said card data and/or add personal information via a data input means at the interactive terminal to create personalized greeting card data for printing on said card;

(d) displaying on said interactive terminal monitor a menu of gift categories accessible via prepaid long distance telephone access accounts and a plurality of gift values from which a customer can select a particular gift category at a selected value via said data input means;

(e) prompting the customer to select said gift category and said value via said data input means;

(f) prompting the customer to provide payment for said card and associated gift;

(g) creating, at said central terminal, a greeting card with said personalized greeting card data;

(h) associating with said greeting card gift information concerning said selected telephone access account including a predetermined telephone number for accessing said prepaid long distance account and account authorizing data;

(i) forwarding the printed card and the associated gift information to a recipient; and (j) redeeming said gift by dialling said predetermined telephone number to access said prepaid telephone account; and (k) entering said authorizing data to validate said recipient as entitled to use said prepaid telephone account.

27. A method as in claim 26, and further including the step of prompting the customer to select between the alternatives of printing and mailing the card and associated gift or electronically creating and electronically forwarding said personalized card and associated gift to a recipient.

28. A method as in claim 27, wherein said creating and associating steps include printing said personalized greeting data on said greeting card and associating printed gift information concerning said selected telephone access account along with said greeting card.

29. A method as set forth in claim 28 wherein said associating step includes printing said gift information including said predetermined telephone number for accessing said prepaid long distance account directly on said card.

30. A method as set forth in claim 29 wherein said gift information printing step includes printing said gift information in a billfold sized window of said card.

31. A method as set forth in claim 30 wherein said billfold sized window includes a margin formed by perforating said card such that said window is easily removable from said card.

32. A method as in claim 26, wherein said forwarding step includes mailing said greeting card and said associated gift information to said recipient.

33. A method as in claim 26, wherein said creating and associating steps include creating an electronic file including said greeting card and said personalized data and gift information concerning said selected telephone access account.

34. A method as in claim 33, wherein said forwarding step includes electronically mailing said electronic file to said recipient for display and/or printing by the recipient.

35. A method as in claim 26, wherein said gift category displaying step includes displaying the following gift category: a prepaid return telephone call via said prepaid telephone account.

36. A method as in claim 26, wherein said gift category displaying step includes displaying the following gift category: a prepaid chance at a skill game accessible via said prepaid telephone account.

37. A method as in claim 26, wherein said gift category displaying step includes displaying the following gift category: toll free remote computer access to prerecorded animation and/or audio or musical messages via said prepaid telephone account.

38. A method as in claim 26, wherein said gift category displaying step includes displaying the following gift category: toll free telephone access to prepaid downloadable software via said prepaid telephone account.

39. A method as in claim 26, wherein said gift category displaying step includes displaying the following gift category: prepaid account on an On-Line computer database accessible via said telephone account.

40. A method as in claim 26, wherein said gift category displaying step includes displaying the following gift category: toll free remote access to prerecorded audio or musical messages via said prepaid telephone account.

41. A method as in claim 40, and further comprising the step of selecting said toll free access to prerecorded audio or musical messages via said prepaid telephone account and customizing said prerecorded audio or musical messages.

42. A method as in claim 41, wherein said customizing step includes:

(a) selecting a prerecorded musical message; and (b) recording, in the customer's own voice, a custom audio message to accompany the prerecorded musical message.

43. A method as in claim 26, wherein said gift category displaying step includes displaying the following gift category: a prepaid gift certificate along with a telephone number and account authorizing data such that the greeting card can be authenticated by calling the telephone number and entering the authorization code.

44. A method as in claim 26, wherein said gift category displaying step includes displaying the following gift category: prepaid EFT cash gift payable at a selected ATM or cash dispensing machine, with a security code accessible via said telephone account.

45. A method as set forth in claim 26 wherein said prompted customer selections are entered by voice via a speech recognition unit.

46. A method of creating and forwarding a combination personalized greeting card and electronically generated gift comprising the steps of:

(a) remotely interconnecting a central terminal and a remotely located interactive terminal over a telephone line;

(b) displaying a menu of alphanumeric and/or graphic information on a monitor at the interactive terminal from which a customer at the interactive terminal can select data to be printed to personalize said card;

(c) prompting the customer to select said card data and/or add personal information via a data input means at the interactive terminal to create personalized greeting card data for printing on said card;

(d) displaying on said interactive terminal monitor a menu of gift categories accessible via prepaid long distance telephone access accounts and a plurality of gift values from which a customer can select a particular gift category at a selected value via said data input means;

(e) prompting the customer to select said gift category and said value via said data input means;

(f) prompting the customer to provide payment for said card and associated gift;

(g) creating, at said central terminal, a greeting card with said personalized greeting card data;

(h) associating with said greeting card gift information concerning said selected telephone access account including a predetermined telephone number for accessing said prepaid long distance account and account authorizing data;

(i) prompting the customer to select between the alternative steps of printing and mailing the card with the associated gift information or electronically creating and electronically forwarding said personalized card and associated gift information to a recipient; and (j) forwarding the card and the associated gift information to a recipient in the selected manner.

47. A method as set forth in claim 46 wherein said card printing step includes printing said gift information including said predetermined telephone number for accessing said prepaid long distance account directly on said card.

48. A method as set forth in claim 47 wherein said gift information printing step includes printing said gift information in a billfold sized window of said card.

49. A method as set forth in claim 48 wherein said billfold sized window includes a margin formed by perforating said card such that said window is easily removable from said card.

50. A method as in claim 46, wherein said creating and associating steps include creating an electronic file including said greeting card and said personalized data and gift information concerning said selected telephone access account.

51. A method as in claim 46, wherein said gift category displaying step includes displaying one or more of the following gift categories:
   (a) a prepaid return telephone call via said prepaid telephone account;
   (b) a prepaid chance at a skill game accessible via said prepaid telephone account;
   (c) toll free remote computer access to prerecorded animation and/or audio or musical messages via said prepaid telephone account;
   (d) toll free telephone access to prepaid downloadable software via said prepaid telephone account;
   (e) prepaid account on an On-Line computer database accessible via said telephone account; and/or
   (f) toll free remote access to prerecorded audio or musical messages via said prepaid telephone account.

52. A method as in claim 51, and further comprising the step of selecting said toll free access to prerecorded audio or musical messages via said prepaid telephone account and customizing said prerecorded audio or musical messages.

53. A method as in claim 52, wherein said customizing step includes:
   (a) selecting a prerecorded musical message; and
   (b) recording, in the customer's own voice, a custom audio message to accompany the prerecorded musical message.

54. A method as in claim 46, wherein said gift category displaying step includes displaying the following gift category: a prepaid gift certificate along with a telephone number and account authorizing data such that the greeting card can be authenticated by calling the telephone number and entering the authorization code.

55. A method as in claim 46, wherein said gift category displaying step includes displaying the following gift category: prepaid EFT cash gift payable at a selected ATM or cash dispensing machine, or via a recipient's existing credit card or bank account, with a security code accessible via said telephone account.

56. A method as set forth in claim 46 wherein said prompted customer selections are entered by voice via a speech recognition unit.

57. A system for creating and forwarding a combination personalized greeting card and electronically generated gift comprising:
   (a) a central computer controlled terminal and printer;
   (b) at least one remotely located interactive terminal with a monitor and a data input means connectable with said central terminal over a telephone line;
   (c) means at said central terminal for transmitting a menu of alphanumeric and/or graphic information to said interactive terminal for display on a monitor at the interactive terminal from which a customer at the interactive terminal can select data to personalize said card;
   (c) means at said central terminal for prompting the customer to select said card data and/or add personal information via a data input means at the interactive terminal to create personalized greeting card data for printing on said card;
   (d) means at said central terminal for transmitting a menu of gift categories accessible via prepaid long distance telephone access accounts and a plurality of gift values from which a customer can select a particular gift category at a selected value via said data input means for display on said monitor on said interactive terminal;
   (e) means at said central terminal for prompting the customer to select said gift category and said value via said data input means;
   (f) payment acceptance means at said central terminal for accepting and verifying payment for said card and gift;
   (g) creating means at said central terminal for creating said card with said personalized greeting card data;
   (h) associating means for associating printed gift information concerning said selected telephone access account including a predetermined telephone number for accessing said prepaid long distance account and account authorizing data; and
   (i) means for forwarding the card and associated gift to a recipient.

58. A system as in claim 57, wherein said gift category transmitting means transmits one or more of the following gift categories for display on said monitor:
   (a) a prepaid return telephone call via said prepaid telephone account;
   (b) a prepaid chance at a skill game accessible via said prepaid telephone account;
   (c) toll free telephone computer access to prerecorded animation and/or audio messages via said prepaid telephone account;
   (d) toll free telephone access to prepaid downloadable software via said prepaid telephone account;
   (e) a prepaid lottery ticket with number selection accessible via said prepaid telephone account;
   (f) toll free remote access to prerecorded audio or musical messages via said prepaid telephone account;
   (g) a prepaid gift certificate along with a telephone number and account authorizing data such that the greeting card can be authenticated by calling the telephone number and entering the authorization code; and
   (h) a prepaid EFT cash gift payable at a selected ATM or cash dispensing machine, with a security code accessible via said telephone account.

59. A system as set forth in claim 57 wherein said authorizing data includes a PIN number.

60. A system as set forth in claim 57 wherein said creating means prints said greeting card and said associating means prints said gift information including said predetermined telephone number for accessing said prepaid long distance account and said account authorizing data in a billfold sized window of said card.

61. A system as set forth in claim 57 wherein said billfold sized window includes a margin formed by perforating said card such that said window is easily removable from said card.

62. A system as in claim 57, wherein said data input means includes a speech recognition unit.

63. A method of creating and retailing a combination personalized greeting card and electronically generated gift comprising the steps of:
   (a) locating an interactive terminal in a first, customer accessible, area of a retail establishment;
   (b) locating a card printer in a second, non-customer accessible, area of said retail establishment, said card printer being connected to said interactive terminal and being controllable via controls located in said second area;

(c) displaying a menu of alphanumeric and/or graphic information on a monitor at the interactive terminal from which a customer at the interactive terminal can select data to be printed to personalize said card;

(d) prompting the customer to select said card data and/or add personal information via a data input means at the interactive terminal to create personalized greeting card data for printing on said card;

(e) displaying on said interactive terminal monitor a menu of gift categories accessible via prepaid long distance telephone access accounts and a plurality of gift values from which a customer can select a particular gift category at a selected value via said data input means;

(f) prompting the customer to select said gift category and said value via said data input means;

(g) printing, on said printer, a greeting card with said personalized greeting card data;

(h) associating with said greeting card gift information concerning said selected telephone access account including a predetermined telephone number for accessing said prepaid long distance account and account authorizing data; and (i) retailing the printed card and gift information to the customer "over the counter" in said retail establishment.

64. A system as set forth in claim 63 wherein said authorizing data includes a PIN number.

65. A method as set forth in claim 63 wherein said card printing step includes printing said gift information including said predetermined telephone number for accessing said prepaid long distance account directly on said card.

66. A method as set forth in claim 64 wherein said gift information printing step includes printing said gift information in a billfold sized window of said card.

67. A method as set forth in claim 65 wherein said billfold sized window includes a margin formed by perforating said card such that said window is easily removable from said card.

68. A method as set forth in claim 63 wherein said card printing step includes printing pricing information directly on said card for pricing said card and gift.

69. A method as set forth in claim 68 wherein said pricing information includes at least one UPC code.

70. A method as in claim 63, wherein said gift category displaying step includes displaying one or more of the following gift categories:

(a) a prepaid return telephone call via said prepaid telephone account;

(b) a prepaid chance at a skill game accessible via said prepaid telephone account;

(c) toll free remote computer access to prerecorded animation and/or audio or musical messages via said prepaid telephone account;

(d) toll free telephone access to prepaid downloadable software via said prepaid telephone account;

(e) prepaid account on an On-Line computer database accessible via said telephone account; and/or (f) toll free remote access to prerecorded audio or musical messages via said prepaid telephone account.

71. A method as in claim 63, wherein said gift category displaying step includes displaying the following gift category: a prepaid gift certificate along with a telephone number and account authorizing data such that the greeting card can be authenticated by calling the telephone number and entering the authorization code.

72. A method as in claim 63, wherein said gift category displaying step includes displaying the following gift category: prepaid EFT cash gift payable at a selected ATM or cash dispensing machine or via a recipient's existing credit card or bank account, with a security code accessible via said telephone account.

73. A method as in claim 72, and further including the steps of:

(a) selecting said prepaid EFT gift category;

(b) prompting the sender to enter payment information including authorization to debit an electronic funds account of the sender; and (c) debiting said electronic funds account prior to printing out said combination card and gift.

74. A method as set forth in claim 63 wherein said prompted customer selections are entered by voice via a speech recognition unit.

* * * * *